United States Patent Office 2,902,097
Patented Sept. 1, 1959

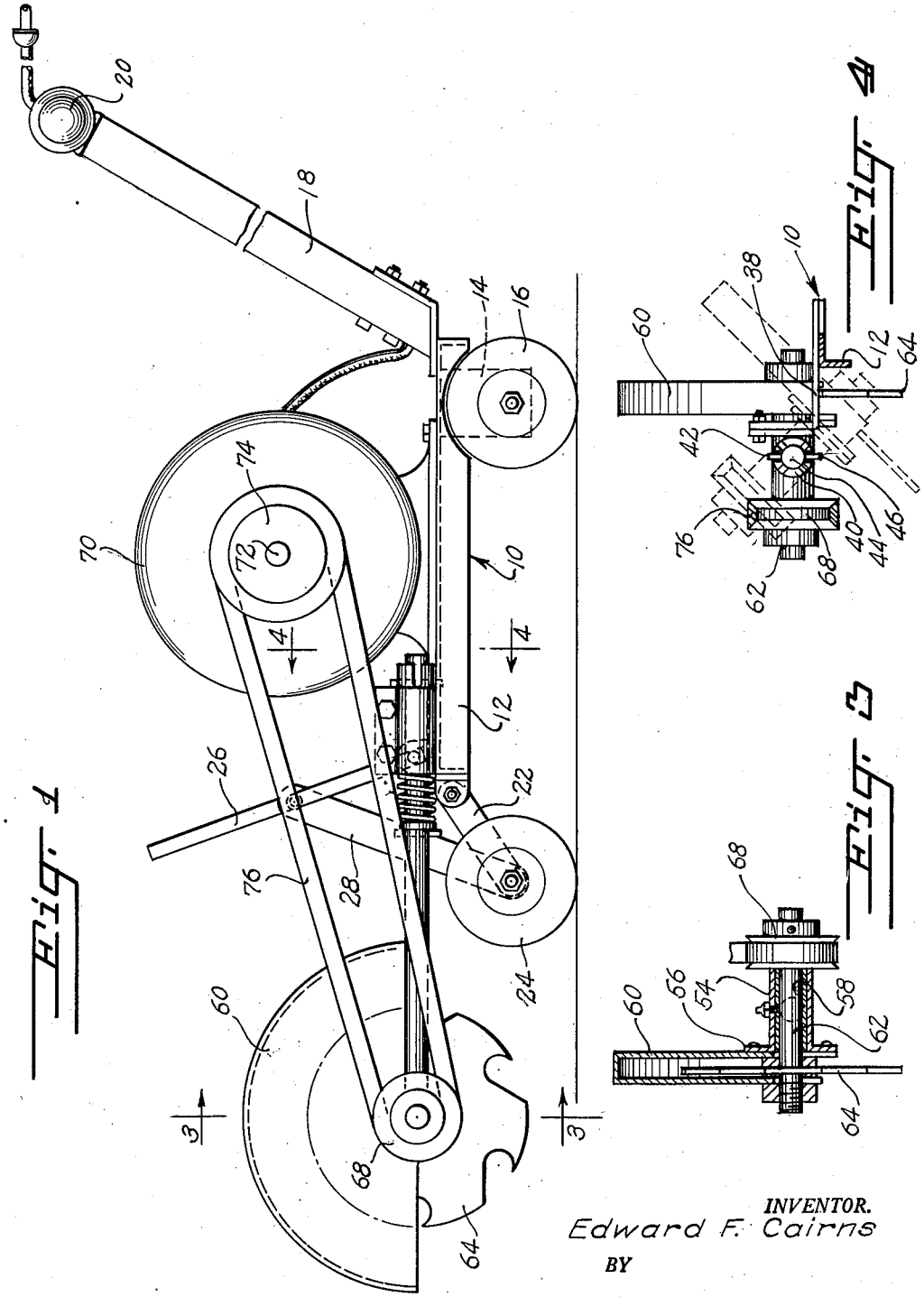

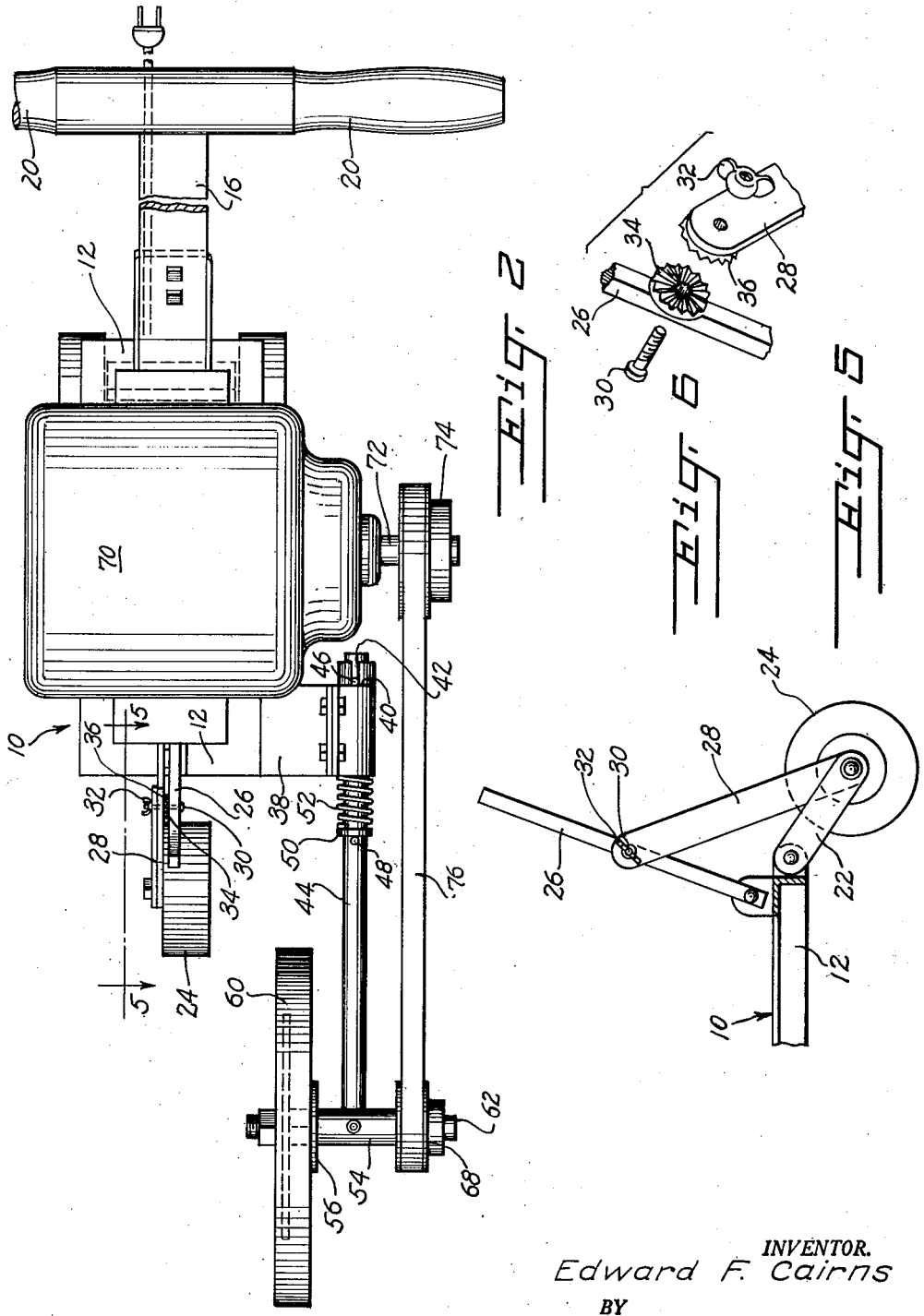

2,902,097

LAWN EDGE TRIMMER

Edward F. Cairns, Compton, Calif.

Application January 22, 1954, Serial No. 405,531

3 Claims. (Cl. 172—15)

This invention relates to an improved lawn edge trimmer and has for its primary object to provide a device which more effectively trims the edge of a lawn adjacent a coping, curb, walk or the like.

Another object is to provide a trimmer whose cutter can be raised and lowered so as to trim the lawn edge to a selected depth and further to select the angle at which the cutter operates to regulate the width of the trough produced by the cutter.

The above and other objects may be attained by this invention which embodies among its features a carriage which is adapted to be advanced along a curb, or walk adjacent the edge of a lawn, a cutter carried by the carriage for rotation about an axis which lies normal to the path of advance of the carriage, and means carried by the carriage and operatively connected to the cutter for rotating it as the carriage advances along a selected path.

Other features include a leg carried by the carriage for movement in a vertical arcuate path adjacent the forward end of the carriage, a ground wheel carried by the leg for movement therewith and for supporting the forward end of the carriage at a selected height, a lever carried by the carriage for movement in a vertical arcuate path adjacent the forward end thereof, a link connected to the leg and to the lever for moving the leg when the lever is moved, and means carried by the lever and operatively engaging the link to hold the link in a selected position relative to the lever and the ground wheel at a selected elevation relative to the carriage.

Other features include a bracket carried by the carriage and projecting laterally outwardly therefrom, a supporting bar mounted on the bracket adjacent the outer end thereof for rotation about its longitudinal axis, a cutter carried by the supporting bar for rotation about an axis which lies perpendicular to the axis of the supporting bar, and means carried by the supporting bar and operatively engaging the bracket for holding the cutter in selected angular positions relative to the path of advance of the carriage.

In the drawings:

Figure 1 is a side view in elevation of a lawn edge trimmer embodying the features of this invention;

Figure 2 is a top plan view of the lawn edge trimmer illustrated in Figure 1;

Figure 3 is a fragmentary sectional view taken substantially on the line 3—3 of Figure 1;

Figure 4 is a fragmentary sectional view taken substantially on the line 4—4 of Figure 1;

Figure 5 is a fragmentary sectional view taken substantially on the line 5—5 of Figure 2; and Figure 6 is a fragmentary exploded view showing the interengaging teeth on the lever and link.

Referring to the drawings in detail, the illustrated device comprises a carriage designated generally 10 in the form of a frame 12 carrying adjacent one end a depending leg 14 upon which a pair of ground engaging wheels 16 are mounted to rotate about a substantially horizontal axis. A suitable handle 18 is carried by the carriage adjacent the leg 14 and extends upwardly and rearwardly from the carriage 10 and is provided adjacent its upper end with transversely extending hand grips 20 by means of which the carriage is propelled along a selected path such as a curb or sidewalk adjacent the edge of a lawn.

Pivotally connected to the frame 12 adjacent the end thereof remote from the wheels 16 is a leg 22 carrying a forward ground engaging wheel 24 which is adapted to move in a vertical arcuate path in front of the carriage 10 to a selected position so that the tilt of the carriage 10 about the axis of the ground engaging wheels 16 may be regulated. A lever 26 is pivotally connected to the frame 12 adjacent the forward end thereof for movement in a vertical arcuate path above the frame and pivotally connected to the lever 26 intermediate its ends, and to the leg 22 is a link 28 which moves the leg 22 in accordance with the shifting of the lever 26 in its arcuate path. As illustrated, the link 28 is coupled to the lever 26 through the medium of a bolt 30 and wing nut 32 and carried by the lever 26 is an annular row of teeth 34 which are adapted to cooperate with a similar annular row of teeth 36 carried by the link 28 in locking the link 28 and the lever 26 in a selected position. It will be understood, of course, that the teeth 34 and 36 encircle the bolt 30 and radiate outwardly therefrom in a conventional manner.

Carried by the frame 12 and extending laterally outwardly therefrom adjacent the forward end thereof is a bracket 38 supporting adjacent its outer end in any suitable manner a sleeve 40 which lies parallel to the longitudinal axis of the carriage 10 and is provided with circumferentially spaced elongated slots 42 which open through the end of the sleeve 40 adjacent the rear end of the carriage. Mounted for rotation and longitudinal sliding movement in the sleeve 40 is a supporting bar 44 carrying adjacent its rear end a cross pin 46 which is adapted to enter diametrically opposed slots 42 to hold the supporting bar in a selected position of rotation about its longitudinal axis. A stop pin 48 is carried by the supporting bar in advance of the sleeve 40 against which a stop collar 50 is seated. Surrounding the supporting bar 44 between the stop collar 50 and the bracket 38 is an expanding coil spring 52 which exerts yielding pressure on the stop collar and cross pin 48 to yieldingly urge the supporting bar forwardly and the cross pin 46 into a slot 42 in the sleeve 40 to hold the supporting bar 44 in selected positions of adjustment about its longitudinal axis. Carried by the supporting bar 44 adjacent the end thereof remote from the cross pin 46 and extending perpendicularly to the axis of the supporting bar is a transversely extending sleeve 54 carrying adjacent one end an outwardly extending annular flange 56. A journal bearing 58 extends through the sleeve 54 and the axis of said journal bearing lies perpendicular to the longitudinal axis of the supporting bar 44. A cutter guard 60 is carried by the flange 56 and partially encloses the cutter to be more fully hereinafter described.

Mounted for rotation in the journal bearing 58 is a shaft 62 on which is mounted for rotation therewith a cutter disc 64, the upper portion of which is housed within the guard 60, while the lower portion projects below the axis of the shaft 62 and is adapted to engage and cut the edge of a lawn, as the device is advanced. Carried by the shaft 62 adjacent the end thereof remote from the cutter disc 64 is a pulley 68 by means of which the cutter disc is rotated. On the carriage 10 intermediate the forward and rear ends thereof is a prime mover 70 to the drive shaft 72 of which is coupled a conventional drive pulley 74. Driving connection is established between the drive pulley 74 and the pulley 68 through the medium of an endless belt 76. It will thus be seen that when the prime mover 70 is in operation, the cutter disc 64 will be driven. While in the drawings, I have illustrated an electric motor as the prime mover 70, it is to be understood that any suitable prime mover may be employed.

In use, the angular position of the cutter disc 64 relative to the vertical is selected by moving the supporting bar 44 against the resistance of the spring 52 so as to move the cross pin 46 out of diametrically opposed slots 42 in the sleeve 40 and rotating the supporting bar 44 about its longitudinal axis so as to tilt the cutter disc 64 at a selected angle, as suggested by the broken lines in Figure 4. The depth to which the cutter disc is to operate is regulated by loosening the wing nut 32 and adjusting the leg 22 about its pivotal connection to the carriage 10 by manipulating the lever 26 and link 28 and subsequently tightening the wing nut to lock the parts in a selected position. With the parts thus adjusted, the prime mover 70 is set into operation to cause the cutter disc 64 to be driven and upon advancing the carriage 10 on the wheels 16 and 24 along a selected path adjacent the edge of the lawn to be cut, it will be evident that the cutter disc 64 will move in a path adjacent the path of advance of the carriage and will trim the lawn edge as the carriage advances. While it is possible to advance the carriage along on the surface of the lawn, it is preferred that it be used on a walk or curbing bordering the edge of the lawn so as to produce an edge cut of uniform depth.

While in the foregoing there has been shown and described the preferred embodiment of this invention, it is to be understood that minor changes in the details of construction, combination and arrangement of parts may be resorted to without departing from the spirit and scope of the invention as claimed.

What is claimed is:

1. In a lawn edge trimmer, a horizontal wheeled frame having a forward end, a first sleeve fixed longitudinally on said frame, a cutter disc supporting bar slidably and rotatably engaged through said first sleeve, a second sleeve transversely disposed with respect to said first sleeve and carried by the end of said bar remote from said first sleeve, a journal bearing extending through said second sleeve, a shaft rotatably mounted in said bearing, a cutter disc carried by said shaft and positioned at a point spaced forwardly from the forward end of the frame, drive means mounted on the frame and operatively connected to said shaft, said first sleeve having a forward end and a rearward end, a stop on said bar spaced from the forward end of the first sleeve, a helical spring circumposed on the bar and compressed between the stop and the forward end of the first sleeve, said first sleeve having circumferentially spaced longitudinal slots opening through its rearward end, and means on said bar engaged in one of the slots and holding the bar in a selected position of axial rotation relative to the frame, said bar being rearwardly movable against the resistance of said spring to remove said means from the slot and enable inserting said means in another one of the slots.

2. In a structure according to claim 1 which includes in addition a single forward leg having a forward end and a rearward end, said rearward end of said single leg being pivoted to the frame at the forward end of the frame with said single leg declining forwardly from the frame, a single forward ground engaging wheel mounted on the forward end of the forward leg, and means operatively connected to said leg and selectively adjusting the position of said leg relative to said frame.

3. In a structure according to claim 1 which includes in addition a single forward leg having a forward end and a rearward end, said rearward end of said single leg being pivoted to the frame at the forward end of the frame with said single leg declining forwardly from the frame, a single forward ground engaging wheel mounted on the forward end of the forward leg, a vertical lever pivoted on the frame, a vertical link pivoted at one end to the forward end of the forward leg and at its other end to an intermediate part of said lever, and means acting between the lever and frame for holding the lever in pivotally adjusted position.

References Cited in the file of this patent

UNITED STATES PATENTS

| | | |
|---|---|---|
| 100,505 | Cook | Mar. 8, 1870 |
| 1,714,196 | Vara | May 21, 1929 |
| 1,720,169 | Cripe | July 9, 1929 |
| 2,034,505 | Cline | Mar. 17, 1936 |
| 2,139,353 | Bruder | Dec. 6, 1938 |
| 2,209,946 | Black | Aug. 6, 1940 |
| 2,220,342 | Maga | Nov. 5, 1940 |
| 2,432,922 | Muzzy | Dec. 16, 1947 |
| 2,526,186 | Allen | Oct. 17, 1950 |
| 2,538,230 | Boggs | Jan. 16, 1951 |
| 2,614,473 | Yacoby | Oct. 21, 1952 |
| 2,618,919 | Hutchens | Nov. 25, 1952 |
| 2,676,447 | Asbury | Apr. 27, 1954 |
| 2,691,264 | Miller | Oct. 12, 1954 |
| 2,695,790 | Ford | Nov. 30, 1954 |
| 2,699,105 | Yerkes | Jan. 11, 1955 |
| 2,791,875 | Faas | May 14, 1957 |